UNITED STATES PATENT OFFICE.

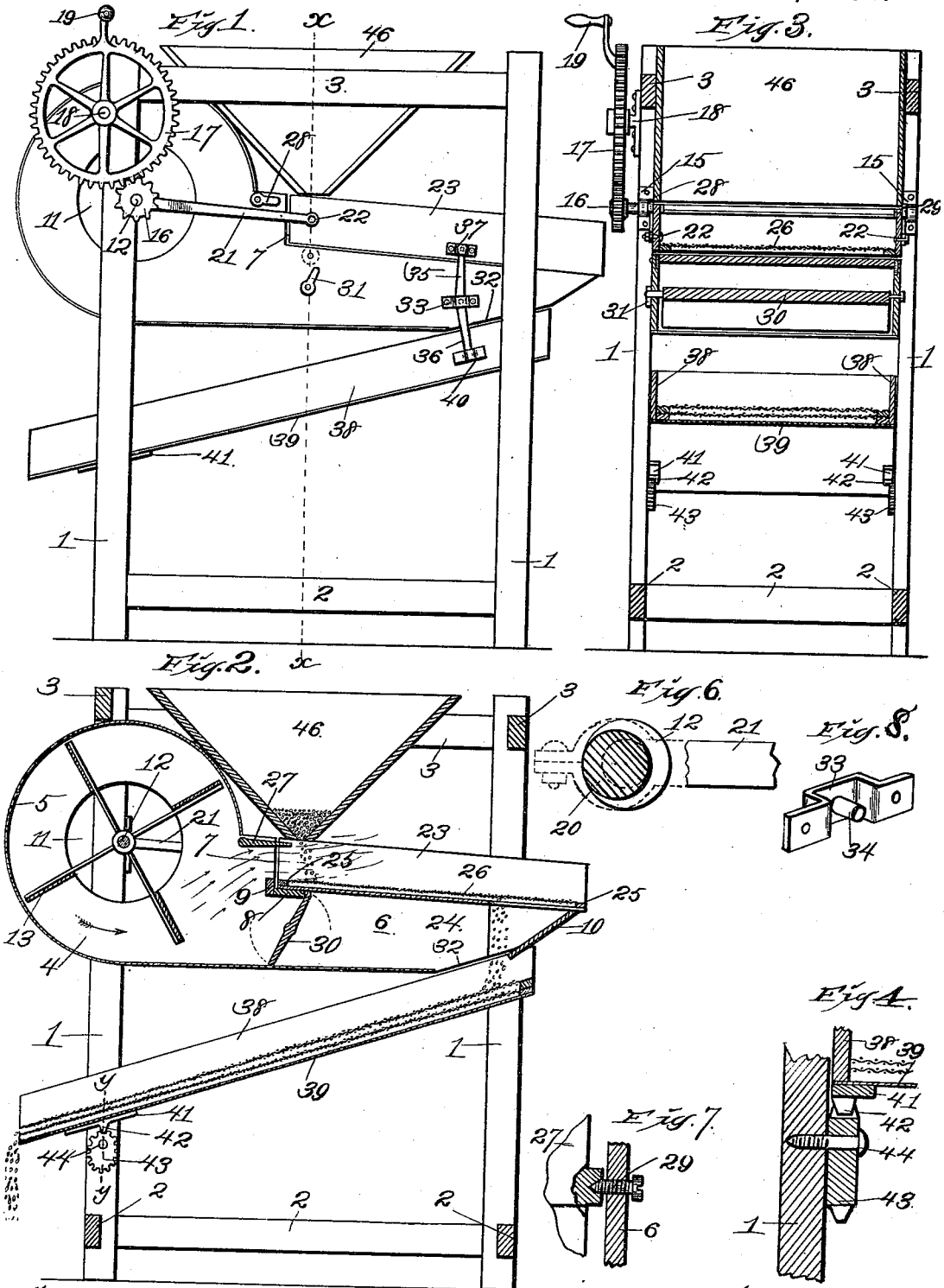
(No Model.)
J. W. HENRY.
SEED CLEANER.
No. 512,702. Patented Jan. 16, 1894.

JOSEPH W. HENRY, OF WESTPORT, MISSOURI.

SEED-CLEANER.

SPECIFICATION forming part of Letters Patent No. 512,702, dated January 16, 1894.

Application filed July 8, 1893. Serial No. 479,875. (No model.)

*To all whom it may concern:*

Be it known that I, JOSEPH W. HENRY, of Westport, Jackson county, Missouri, have invented certain new and useful Improvements in Seed-Cleaners, of which the following is a full, clear, and exact description, reference being had to the accompanying drawings, forming a part hereof.

My invention relates to seed-cleaners, and has for its object to produce a seed cleaning apparatus which is effective in operation, and which is simple, durable and cheap of construction.

With this object in view, my invention consists in certain peculiar and novel features of construction and combinations of parts, as will be hereinafter described and claimed.

In order that my invention may be fully understood, I will proceed to describe it with reference to the accompanying drawings, in which—

Figure 1, is a side elevation of a seed cleaner constructed in accordance with my invention. Fig. 2, is a vertical longitudinal section of the same. Fig. 3, is a vertical cross sectional view taken on the line $x$—$x$ of Fig. 1. Fig. 4, is a vertical sectional view taken on the line $y$—$y$ of Fig. 2. Fig. 5, is a side view of one end of the fan wheel shaft to more clearly disclose the eccentric thereon. Fig. 6, is a sectional view through the eccentric portion of the shaft, and showing a portion of the eccentric rod in dotted lines and connected to said eccentric. Fig. 7, is a vertical sectional view to show the manner of tensioning the wind deflector-boards or valves. Fig. 8, is a detail perspective view of the casting or bracket secured to the fan wheel casing.

In the said drawings, 1 designates a series of standards or uprights which are arranged or disposed rectangularly, and these standards or uprights are connected near their lower ends by horizontal cross bars 2, and near their upper ends by horizontal cross bars 3; thus forming a strong and substantial framework. It is to be understood, however, that this framework forms no essential part of my invention, and that it may be formed in any suitable manner as occasion may require. Mounted in the upper portion of this framework is a fan-wheel casing, consisting of the sides 4—4, and the circular rim 5 which unites said sides near their outer margins. The sides 4 at their front end are extended for a suitable distance as shown at 6, and the rim or connecting portion 5 is extended from its lowest point horizontally forward for a suitable distance and connects said sides 6 at their lower margin; thus leaving an opening in the front and lower side of the rim 5 through which the air is forced. A suitable distance forward of the upper end of said opening the side-walls 6 are recessed at 7, and connecting the side walls 6 at the lower and inner end of said recess is a horizontal bar 8. A bar or strip 9 is secured to the inner margin of the bar 8 and projects thereabove for a suitable distance and also extends from side wall to side wall.

Connecting the outer ends of the side walls 6 is an inclined deflector and guide-board 10. Circular openings 11 are formed centrally through the circular side portions 4 of the casing, and extending centrally therethrough is a shaft 12 upon which the fan-wheel 13 is mounted. This fan wheel shaft at 14, is journaled in bearings 15 secured to the adjacent standards 1, by screws or other suitable means, and carried upon the outer end of this shaft is a gear-pinion 16 which meshes with a gear-wheel 17 mounted upon a stub-shaft 18 carried by a bracket secured to the framework. This gear-wheel is preferably provided with a crank-handle 19, by which it may be operated. Formed near the ends of the shaft 12 are the eccentric enlargements 20, and pivotally mounted upon said enlargements at their rear ends are the actuating bars 21; these bars being pivotally connected at 22 to the rear ends of the inclined shoe 23. The shoe 23 has its longitudinally extending side walls connected by the bottom plate 24, and this bottom plate terminates a suitable distance from the outer ends of said side walls. The side walls are also united at their lower and inner and outer corners by cross strips 25 upon which the screen section 26 is mounted. The shoe 23 is inclined oppositely to the board 10, and rests at its inner end upon the cross bar 8 and at its outer end upon the said deflector and guide board 10. It will thus be seen that when in position this shoe forms practically a continuation of the extensions 6 of the fan casing and that the bottom 24 thereof divides said extensions into an upper and lower compartment, the outer ends of which communicate. Pivotally mounted between the side walls of the casing at the junction of the sides 4, extensions 6, and the upper margin of the opening in the rim 5, is a valve or wind-board 27; this valve or wind board extending transversely of the fan-casing, and is adapted to close the space between said casing and the upper compartment, that is, the inner end of the shoe 23. This valve 27 is provided with a handle 28 upon one end at the outer side of the casing, by which it may be operated, and is formed with a recess in its opposite end into which a set-screw 29 passing through the other side of the casing engages, so that the valve board may be so tensioned that it will hold any position in which it is placed, to permit more or less of the air-blast to pass into the upper compartment. A valve 30 extends horizontally from side wall to side wall of the fan casing, and is located beneath the inner end of the shoe 23, and is adapted to control the passage of air into the lower compartment, and this valve is also provided at one side of the casing with a handle 31 and is also adapted to be provided with a tensioning device similar to the set-screw 29, at its opposite end. That portion of the side walls 6—6 of the casing extending from the outer end of the rim 5 to the deflector board 10 is beveled as shown at 32, for a purpose to be presently explained. A U-shaped bracket 33 is secured by screws or other suitable means to one side of the casing, and this bracket is formed with a cylindrical stud or projection 34 which pivotally engages an opening, at the junction of an upwardly extending arm 35 and a downwardly extending arm 36 of a bent-lever; the upwardly extending arm being arranged approximately at right angles to the shoe 23, and pivotally engaging a stud, similar to the stud 34, of a bracket 37 secured to the adjacent side of said shoe 23.

The arm 36 extends at right angles to the beveled margin 32 at the lower side of the fan-casing. A shoe consisting of the side walls 38 and the bottom 39 is arranged to extend parallel and adjacent to the inclined margin 32 of the fan-casing. This shoe is provided with a bracket 40 secured by screws or other suitable means near its upper end, and this bracket is provided with a stud similar to the stud 34, which pivotally engages the lower end of the arm 36. The other end of the shoe is provided at its under side with the brackets 41 from which project downwardly teeth 42, and these teeth engage each an elliptic gear-wheel 43, mounted loosely upon screws 44, which pass into the adjacent standards of the framework. By raising the free and lower end of said shoe a suitable distance, these elliptic gears may be operated to a new position, so that the elevation of the free end may be changed.

Secured in the upper portion of the framework so that its open lower end shall be above and communicate with the inner end of the shoe 23 is a grain hopper 46 of the usual construction.

The operation is as follows: The grain being introduced or poured into the hopper 46 passes down and into the inner end of the shoe 23. At the same time the fan wheel is operated to cause a blast of air to pass below the valve 27, which is opened as shown in Fig. 2, and intersect said grain in its passage from the hopper to the shoe and blow or remove the chaff and dust therefrom, and at the same time that the fan wheel is operated the eccentric enlargement 20 causes the longitudinal reciprocation or shaking of the shoe 23; this reciprocation or shaking, because of the eccentric enlargement 20, giving simply a short, quick shake in a plane corresponding to the inclination which the shoe occupies, and therefore avoids any jolting or jarring movement of the shoe. This movement sifts the finer grain and particles through the screen section 26, upon the bottom 24, and when this grain reaches the outer end of said bottom 24 and begins to fall upon or pass by the deflecting board 10, the air passing through the lower compartment, the valve 30 of which is opened for this purpose, subjects it to a second cleaning action and the arrangement of the deflecting board is such that this grain shall be guided into the upper end of the lower shoe, and that the air passing through the lower compartment shall also be directed up through the outer end of the screen section 26 and remove any dust or chaff from the coarser grain which is fed from the end of the shoe 23, into the receptacle (not shown) placed for the purpose. The finer grain which descends into the lower shoe, which is provided with one or more screen sections of the usual construction and arrangement, is again subjected to the sifting operation, the lower shoe obtaining its shaking or reciprocatory movement from the upper shoe through the medium of the bent-lever, and by arranging the arm 36 approximately at right angles to the shoe, a longitudinal movement is obtained in the plane of said shoe. This longitudinal movement of the lower shoe separates the grain into different grades in the usual manner, and through the connection of the teeth 42, therewith, the elliptic gear-wheels are simply rocked upon the bolts 44, the longitudinal movement of the shoe being only slight. It is found in practice, that the short smooth shake obtained from the pivoted lever connecting the separating shoes, and having its arms approximately at right angles to the planes of said shoes, better facilitates the separation of seeds of different kinds from each other, than any jarring, jumping or jolting motion, the tendency of which is rather to more thoroughly mix than separate the seeds.

From the above description, it will be seen that I have produced a seed cleaner, which is effective in operation, and which is simple, durable and inexpensive of construction.

Having thus described my invention, what I claim as new, and desire to secure by Letters Patent, is—

In a seed cleaner, having a suitable framework, the combination with a fan casing having a fan, a grain hopper, and a shoe having screens operatively connected to the shaft of the fan, and a second shoe arranged below the first mentioned shoe and inclined oppositely and a strap or bar pivotally carried by the fan casing and pivotally connected to the first mentioned shoe and pivotally connected to the last mentioned shoe, and an elliptic toothed-wheel adjustably mounted upon a pivot, and a tooth depending from the lower or last mentioned shoe and engaging said wheel, substantially as set forth.

In testimony whereof I affix my signature in the presence of two witnesses.

JOSEPH W. HENRY.

Witnesses:
  G. Y. THORPE,
  M. P. SMITH.